United States Patent [19]
Degen et al.

[11] Patent Number: 5,395,636
[45] Date of Patent: Mar. 7, 1995

[54] METHOD OF PRETREATING A POROUS MEDIUM

[75] Inventors: Peter J. Degen, Huntington, N.Y.; Tony Alex, Kendall Park, N.J.; Michael R. Gildersleeve, Nesconset; Joseph W. Dehn, Jr., Great Neck, both of N.Y.

[73] Assignee: Pall Corporation, East Hills, N.Y.

[21] Appl. No.: 97,437

[22] Filed: Jul. 26, 1993

[51] Int. Cl.⁶ .................. C12C 7/18; A23C 1/00; B01D 37/02; C12H 1/00
[52] U.S. Cl. .................. 426/422; 426/490; 426/491; 426/495; 210/500.38; 210/777
[58] Field of Search .......... 210/639, 500.38, 777; 426/580, 592, 422, 490, 491, 495

[56] References Cited

U.S. PATENT DOCUMENTS 4,340,479  7/1982  Pall .
4,485,040  11/1984  Roger et al. .................. 260/122
5,256,437  10/1993  Degen et al. .................. 426/580

FOREIGN PATENT DOCUMENTS 3626498  2/1988  Germany .
1020049  10/1973  Japan .

OTHER PUBLICATIONS

Ultrafiltration Handbook, Cheryan, M., Technomic Publishing Co., Inc., U.S., 1986, pp. 174–183.

Primary Examiner—Donald E. Czaja
Assistant Examiner—Curtis E. Sherrer
Attorney, Agent, or Firm—Leydig, Voit & Mayer, Ltd.

[57] ABSTRACT

The present invention provides a method of pretreating a porous medium for use in filtering a protein-containing fluid, such as milk, beer, wine, or the like, which method comprises contacting a porous medium with an aqueous citrate solution prior to passing the protein-containing fluid through the porous medium.

17 Claims, 1 Drawing Sheet

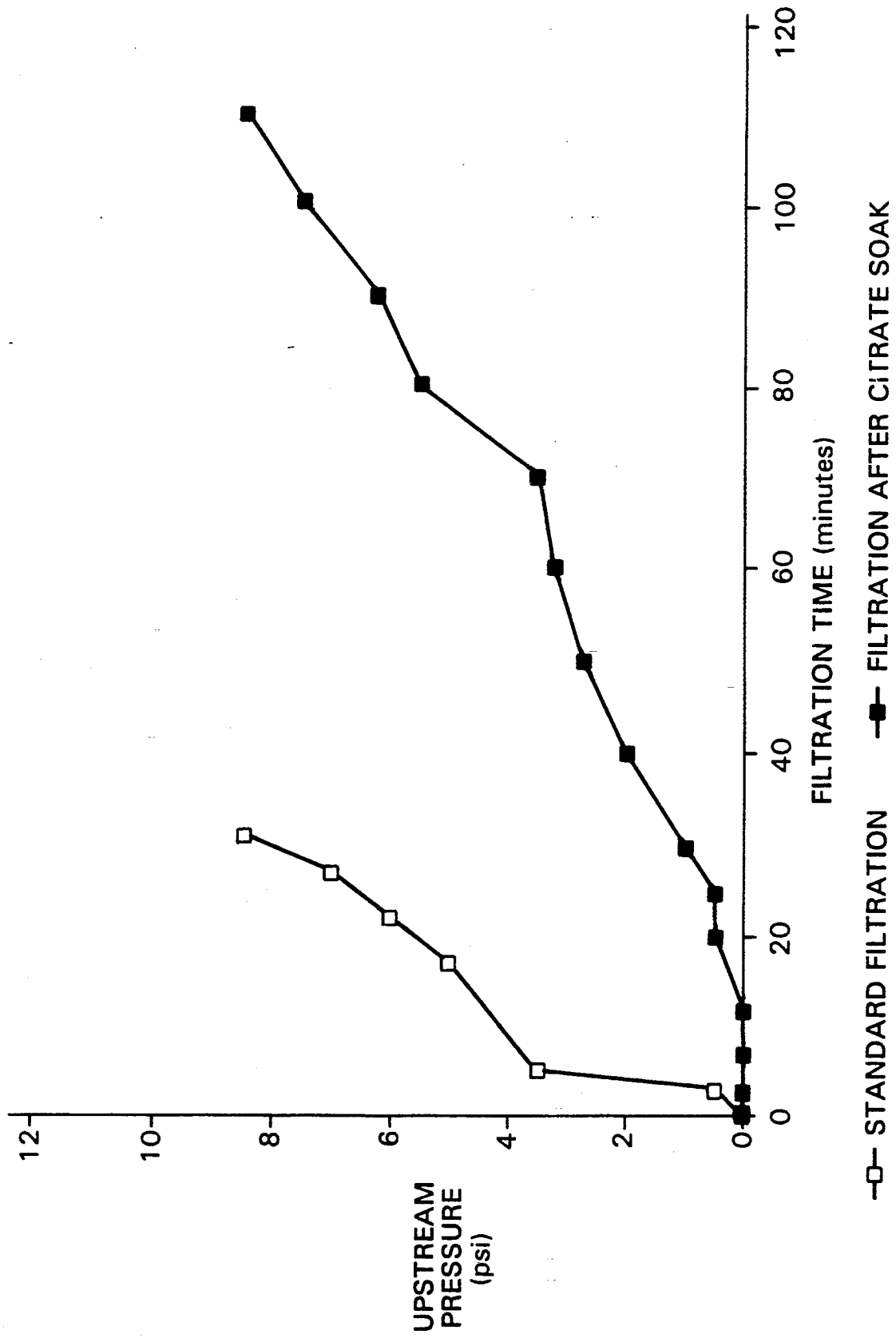

METHOD OF PRETREATING A POROUS MEDIUM

TECHNICAL FIELD OF THE INVENTION

The present invention pertains to a method of treating a porous medium prior to use in filtering a protein-containing fluid in such a manner so as to significantly increase the time during which useful filtration can be carried out and so as to forestall the clogging of the porous medium.

BACKGROUND OF THE INVENTION

Porous media, particularly microporous membranes, are used to filter a variety of fluids. During the course of filtering fluids, the porous media eventually become clogged or plugged with impurities and/or other fluid components. This is particularly a problem in the filtration of protein-containing fluids. Natural proteins, such as those in milk, beer, and wine, can quickly plug porous media such as microporous membranes. In the filtration of such protein-containing fluids, it is typically desirable to maintain a constant filtrate flow through the porous medium by increasing the upstream pressure over time. As a result, however, pore clogging increases, and the flow through the porous medium becomes impeded, at an exponential rate. Thus, even though fluid can perhaps be passed through the porous medium with a high upstream applied pressure, e.g., more than 15 psi, the effective life of the porous medium is essentially over when an undesirably high upstream pressure, e.g., about 5-10 psi or so, is required to maintain satisfactory filtrate flow through the porous medium.

While a clogged filtration medium can be replaced, the costs involved in such replacement can be quite significant. Thus, many techniques have been developed to unclog porous media. These unclogging techniques, however, may damage porous media, particularly microporous membranes, or leave contaminants in the porous media if not thoroughly washed prior to reuse. In addition, both the replacement of porous media and the unclogging procedures typically involve halting the filtration process, thereby resulting in potentially significant and undesirable downtime in the filtration process.

Accordingly, there remains a need for a method of filtering a protein-containing fluid through a porous medium, particularly a microporous membrane, such that clogging of the porous medium is forestalled and filtration downtime is reduced. Such a method should also provide for an increased period of time during which useful filtration of a protein-containing fluid can be carried out, without a significantly increased upstream pressure to maintain a constant filtrate flow through the porous medium. Furthermore, such a method should not run the risk of damaging the porous medium or of introducing contaminants into the porous medium and/or fluid being filtered by the porous medium. The method of accomplishing these desirable conditions should also be such that it can be efficiently and economically used. The present invention provides such a method of pretreating a porous medium used to filter a protein-containing fluid through a porous medium.

These and other objects and advantages of the present invention, as well as additional inventive features, will be apparent from the description of the invention provided herein.

BRIEF SUMMARY OF THE INVENTION

The present invention provides a method of pretreating a porous medium for use in filtering a protein-containing fluid. The method comprises contacting a porous medium with an aqueous citrate solution prior to passing a protein-containing fluid through the porous medium. The present invention also provides a method of filtering a protein-containing fluid comprising passing a protein-containing fluid through a porous medium which has been pretreated with an aqueous citrate solution. The protein-containing fluid will typically be a natural protein-containing fluid such as milk, beer, wine, or the like, and the present invention is particularly well-suited for use with porous media such as microporous membranes.

BRIEF DESCRIPTION OF THE DRAWINGS

FIG. 1 is a graph of upstream pressure (psi) versus filtration time (minutes) observed in the filtration of skim milk through an untreated microporous membrane (□) and through a microporous membrane which had been presoaked in an aqueous citrate solution (■).

DESCRIPTION OF THE PREFERRED EMBODIMENTS

The present invention is predicated on the surprising discovery that a porous medium treated with an aqueous citrate solution prior to use in filtering a protein-containing fluid provides for a significantly increased period of time during which useful filtration can be carried out and significantly forestalls pore clogging in the porous medium.

The present invention provides a method of pretreating a porous medium for use in filtering a protein-containing fluid, which method comprises contacting a porous medium with an aqueous citrate solution prior to passing a protein-containing fluid through the porous medium. The protein-containing fluid may be any such fluid, but will typically be a natural protein-containing fluid such as milk, beer, wine, or the like. Citrate ions have been found to be particularly effective in increasing the useful filtration time, and in forestalling the clogging, of porous media such as microporous membranes used in the filtration of milk and beer, particularly milk.

The porous medium may be contacted with citrate ions in any suitable manner and under any suitable conditions such that the citrate ions are present during the filtration process. Such a preconditioning of the porous medium may be effected by, for example soaking or otherwise contacting the porous medium with an aqueous citrate solution, preferably prepared from a citrate salt. Suitable citrate salts include potassium and sodium citrate salts, among others, and combinations thereof. Trisodium citrate is most preferred.

The contact with the aqueous citrate solution may be for any suitable period of time, generally about 5-10 minutes or more, and preferably at least about 10 minutes. The porous medium may be contacted with the citrate ions at ambient temperature, e.g., about 20°-25° C., although such contact can also take place at elevated temperatures, e.g., about 25° C. to about 80° C.

While the citrate ions may be in any suitable concentration, it has been found that the concentration of citrate ions can be rather low, e.g., 1 wt. % or less, and still be effective. The preferred citrate ion concentration is about 0.1 wt. % to about 0.5 wt. %., although citrate ion concentrations higher than 0.5 wt. %, or even higher than 1 wt. %, can be used if necessary and desirable.

Since some natural-protein containing fluids already contain citrate ions, such as milk, the low concentration of citrate ions used in the course of practicing the present invention avoids the inadvertent introduction of an unnatural impurity into the fluid being treated with the porous medium. Indeed, natural milk can inherently contain about 0.10–0.16 wt. % citrate ion, and U.S. federal regulations allow for up to 0.3–0.5 wt. % citrate ion in some milk products, e.g., powdered and evaporated milk. Thus, the present inventive method practiced with a low concentration of citrate ions is particularly well-suited for the filtration of milk through porous media.

The present inventive method is suitable for use on any porous medium prepared from any suitable material, such as microporous membranes, metal filtration media, ceramic filters, and fibrous woven and nonwoven media. The present inventive method is particularly well-suited for use on a microporous membrane, such as those prepared in accordance with U.S. Pat. No. 4,340,479. The treatment method is especially useful in the preconditioning of polyamide membranes, e.g., nylon membranes, which can be used in the filtration of a natural protein-containing fluid such as milk, in accordance, for example, with pending U.S. patent application Ser. No. 08/045,971, filed Apr. 9, 1993, and pending U.S. patent application Ser. No. 07/901,238, filed Jun. 19, 1992.

The following examples further illustrate the present invention but, of course, should not be construed as in any way limiting its scope.

EXAMPLE 1

This example illustrates the clogging of a porous medium during the normal course of filtering a protein-containing fluid and need to increase upstream pressure to maintain a constant filtrate flow through the porous medium.

Skim milk was heated to 55° C., homogenized at 2500/500 psi in a two-stage homogenizer, and filtered through a dynamic microfiltration unit in accordance with the method disclosed in pending U.S. patent application Ser. No. 08/045,971, filed Apr. 9, 1993, and U.S. patent application Ser. No. 07/901,238, filed June. 19, 1992. The dynamic microfiltration unit was a Pall Corporation dynamic microfiltration unit equipped with a 0.45 micron pore size nylon Ultipor ® N66 membrane (Pall Corporation, East Hills, N.Y.). The skim milk was fed at the rate of about 1000 ml/min into the dynamic microfiltration unit. The dynamic microfiltration unit was operated at 3450 rpm, and the filtrate flow was maintained at a constant rate of about 700 ml/min (3000 l/m²/hr). The upstream pressure increase was monitored over time, and a prefiltration integrity test, as well as a postfiltration integrity test, was conducted. The following data was obtained as a result of this experiment:

| Time (min) | Upstream Pressure Increase (psi) |
| --- | --- |
| 0 | 0 |
| 3 | 0.5 |
| 5 | 3.5 |
| 17 | 5 |
| 22 | 6 |
| 27 | 7 |
| 31 | 8.5 |

This data is depicted in FIG. 1 as a graph of upstream pressure increase (psi) versus filtration time (minutes), wherein the data points are represented by the symbol □. As is apparent from the foregoing data, and particularly the graph, pore clogging increases, and the flow through the porous medium becomes impeded, at an essentially exponential rate. The time during which useful filtration can be carried out is generally that time prior to the point at which the upstream applied pressure sharply increases to maintain constant filtrate flow, e.g., about 5 psi for skim milk in this example.

As shown in the raw data in the above table and as depicted in the graph of FIG. 1, the upstream applied pressure sharply increases almost immediately upon the initiation of filtration and reaches an upstream pressure increase of 5 psi in about 17 minutes. In addition, the substantial plugging of the pores of the porous medium occurs in about 31 minutes, as evidenced by the time required before an upstream pressure increase of 8.5 psi is required to maintain constant filtrate flow.

EXAMPLE 2

This example demonstrates the use of the present invention in increasing the time during which useful filtration of a protein-containing fluid can be carried out with a porous medium and forestalling the clogging of the porous medium in the filtration of the protein-containing fluid.

Skim milk was heated to 55° C., homogenized at 2500/500 psi in a two-stage homogenizer, and filtered through a dynamic microfiltration unit in accordance with the method disclosed in pending U.S. patent application Ser. No. 08/045,971, filed Apr. 9, 1993, and U.S. patent application Ser. No. 07/901,238, filed Jun. 19, 1992. The dynamic microfiltration unit was a Pall Corporation dynamic microfiltration unit equipped with a 0.45 micron pore size nylon Ultipor ® N66 membrane (Pall Corporation, East Hills, N.Y.). The microporous membrane was soaked in an aqueous 0.5 wt. % trisodium citrate solution at 55° C. for about 10 minutes prior to filtration of the skim milk. The skim milk was fed at the rate of about 1000 ml/min into the dynamic microfiltration unit. The dynamic microfiltration unit was operated at 3450 rpm, and the filtrate flow was maintained at a constant rate of about 700 ml/min (3000 l/m²/hr). The upstream pressure increase was monitored over time, and a prefiltration integrity test, as well as a postfiltration integrity test, was conducted. The following data was obtained as a result of this experiment:

| Time (min) | Upstream Pressure Increase (psi) |
| --- | --- |
| 0 | 0 |
| 2 | 0 |
| 7 | 0 |
| 12 | 0 |
| 20 | 0.5 |
| 25 | 0.5 |
| 30 | 1 |
| 40 | 2 |
| 50 | 2.75 |

-continued

| Time (min) | Upstream Pressure Increase (psi) |
| --- | --- |
| 60 | 3.25 |
| 70 | 3.5 |
| 80 | 5.5 |
| 90 | 6.25 |
| 100 | 7.5 |
| 110 | 8.5 |

This data is depicted in FIG. 1 as a graph of upstream pressure increase (psi) versus filtration time (minutes), wherein the data points are represented by the symbol ■. As is apparent from the foregoing data, the treatment of the porous medium with an aqueous citrate solution prior to filtration of a protein-containing fluid through the porous medium greatly extends the time during which useful filtration of the protein-containing fluid can be carried out and significantly forestalls the clogging of the porous medium. The time during which useful filtration can be carried out is generally that time prior to the point at which the upstream applied pressure sharply increases to maintain constant filtrate flow, e.g., about 5 psi for skim milk in this example.

As shown in the raw data in the above table and as depicted in the graph of FIG. 1, the present invention provides for a much longer period of time before this point of sharply increasing upstream applied pressures is reached. Specifically, while the filtration with skim milk through the porous medium set out in Example 1 almost immediately begins a sharp increase in upstream applied pressure and rapidly reaches an upstream pressure increase of 5 psi in about 17 minutes, the present invention involving the pretreatment of the porous medium with an aqueous citrate solution allows for a considerable period of time during which the upstream applied pressure increases at a relatively flat rate with the result that an upstream pressure increase of 5 psi is not reached for nearly 80 minutes. As a result, the present invention provides for a surprising several-fold increase in the useful filtration time of the porous medium. In addition, the present invention significantly forestalls the substantial plugging of the pores of the porous medium for about 110 minutes, as evidenced by the time required before an upstream pressure increase of 8.5 psi is required to maintain constant filtrate flow. This period of time is about triple that for the filtration of skim milk through the untreated porous medium utilized in Example 1.

Accordingly, it is quite clear that the preconditioning of the porous medium by contacting the porous medium with an aqueous citrate solution results in a substantial increase in the time during which useful filtration of a protein-containing fluid can be carried out and greatly forestalls the clogging of the porous medium in the filtration of the protein-containing fluid.

All of the references cited herein, including patents and patent applications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of pretreating a porous medium for use in filtering a protein-containing fluid, which method comprises contacting a porous medium with an aqueous citrate solution prior to passing a protein-containing fluid through said porous medium.

2. The method of claim 1, wherein said aqueous citrate solution has a concentration of no more than about 0.5 wt. % citrate ions.

3. The method of claim 1, wherein said aqueous citrate solution is an aqueous solution of a citrate salt selected from the group consisting of potassium and sodium citrate salts and combinations thereof.

4. The method of claim 3, wherein said aqueous citrate solution is an aqueous solution of trisodium citrate.

5. The method of claim 1, wherein said protein-containing fluid is a natural protein-containing fluid.

6. The method of claim 5, wherein said protein-containing fluid is selected from the group consisting of milk, beer, and wine.

7. The method of claim 6, wherein said protein-containing fluid is milk.

8. The method of claim 1, wherein said porous medium is a microporous membrane.

9. The method of claim 8, wherein said microporous membrane is a polyamide membrane.

10. The method of claim 1, wherein said aqueous citrate solution is at about 25° C. to about 80° C.

11. The method of claim 1, wherein said porous medium is contacted with said aqueous citrate solution for at least 10 minutes.

12. A method of filtering a protein-containing fluid comprising pretreating a porous medium in accordance with the method of claim 1 and then passing a protein-containing fluid through said pretreated porous medium.

13. The method of claim 12, wherein said protein-containing fluid is a natural protein-containing fluid.

14. The method of claim 13, wherein said protein-containing fluid is selected from the group consisting of milk, beer, and wine.

15. The method of claim 14, wherein said protein-containing fluid is milk.

16. The method of claim 12, wherein said porous medium is a microporous membrane.

17. The method of claim 16, wherein said microporous membrane is a polyamide membrane.

* * * * *